United States Patent [19]

Ogasawara

[11] Patent Number: 4,965,502
[45] Date of Patent: Oct. 23, 1990

[54] DRIVE CONTROLLING APPARATUS
[75] Inventor: Akira Ogasawara, Kawasaki, Japan
[73] Assignee: Nikon Corporation, Tokyo, Japan
[21] Appl. No.: 357,726
[22] Filed: May 26, 1989
[30] Foreign Application Priority Data May 31, 1988 [JP]  Japan ................................ 63-133191

[51] Int. Cl.$^5$ ............................................. G05B 11/01
[52] U.S. Cl. .................................... 318/628; 318/264;
                                                318/286; 318/603; 318/626
[58] Field of Search ............... 318/264, 265, 266, 275,
       318/277, 282, 286, 466, 467, 468, 469, 603, 626,
                                                                      628

[56]  References Cited
U.S. PATENT DOCUMENTS 4,468,596  8/1984  Kinzl et al. .......................... 318/287
4,563,623  1/1986  Matsuka .............................. 388/810
4,585,981  4/1986  Zintler ............................. 318/266 X
4,628,234 12/1986  Mizuta et al. ..................... 318/264 X
4,641,067  2/1987  Iizawa .............................. 318/286 X Primary Examiner—Bentsu Ro
Attorney, Agent, or Firm—Shapiro and Shapiro

[57]  ABSTRACT

A drive controlling apparatus for controlling movement of a movable member having a mechanically limited range of movement, comprises a drive device for driving the movable member, a feedback pulse generator for detecting the movement of the movable member and for outputting a number of pulse signals corresponding to an amount of the movement of the movable member, a main timer for measuring the period of the pulse signals, and for outputting a signal when a measured time period coincides with one of a plurality of comparison values, a sub timer for measuring one or more time periods from the start of the drive device to the steady state of the drive device and for changing the plurality of comparison values successively, and a control circuit for stopping the drive device in response to the signal outputted from the main timer.

6 Claims, 8 Drawing Sheets

DRIVE CONTROLLING APPARATUS

BACKGROUND OF THE INVENTION

1. Field of the Invention

The present invention relates to a drive controlling apparatus for a movable member, and more particularly, it relates to a drive controlling apparatus for a movable member for which a range of movement is limited due to mechanical limitations and the like.

2. Related Background Art

In a normal driving system wherein a rotational force generated by a motor is transmitted to a load through a gear transmission mechanism, when a range of movement of a movable member constituting the load is mechanically limited, it is necessary to quickly detect the fact that the movable member reaches the limitation (in other words, the movable member is abutted against a stop and the like for limiting the range of the movement of the movable member) to prevent damage of the motor and/or stops.

FIG. 8 schematically shows a conventional driving mechanism wherein a movable member is shifted linearly. A rotational movement of a gear 1 fixed to a motor shaft 1A is converted into a longitudinal linear movement of a rack 2 constituting the movable member. The movement of the rack is limited by abutting an edge 2a or 2b of the rack 2 against a stop member 3 or 4.

In FIG. 8, if, after the rack 2 is abutted against the stop member 3 or 4, the rack continues to be forced against the stop member, the stop member 3 or 4 and/or the driving motor may be damaged. Normally, when such driving system is servo-controlled, a control circuit (not shown) always monitors the moving of the movable member, and emits a command signal for stopping the driving system it when detects the fact that the movable member is not moved.

The principle thereof is as shown is FIG. 9. FIG. 9 shows an example of a method for detecting the fact that the movable member reaches one of the limitations (stops). In FIG. 9, (a) designates a pulse signal generated according to the movement of the movable member, (b) designates an output from a timer in a detection circuit (not shown). The timer is a forwardly counting timer wherein the counting value representative of the output obtained by counting reference clocks from a oscillation circuit is increased.

Each time when the pulse (a) is inputted, the counting value (b) outputted from the timer is reset to zero. If the pulse (a) is not inputted within a predetermined time te after the movable member 2 is stopped by abutting against the stop 3 or 4, the counting value in the timer reaches a comparison value h corresponding to the predetermined time te, whereby a signal (c) is generated from the timer, thus detecting the fact that the movable member reaches the stop and is stopped there (hereinafter, the above-mentioned predetermined time is referred to as "time-out time period", and the detection at the limitation is referred to as "time-out").

That is to say, the comparison value h corresponds to the time-out time period te for detecting the pulse output when the movable member is not moved, due to reaching the limitation. And, if a the pulse is outputted in correspondence to the movement of the movable member within this time period te, the counting value in the timer is cleared to zero each time when such pulse is outputted, with the result that the time-out signal (c) is not outputted. However, if a pulse is not outputted within such time period, the time-out signal (c) is outputted, whereby the control circuit (not shown) detects the fact that the movable member reaches the limitation, thus stopping the supply of current to the motor.

For example, in an auto-focus control system for performing an focusing operation by rotating an optical system holding cylinder of a taking lens in a camera having an auto-focusing device, the taking lens is normally servo-controlled so that the taking lens is focused to an object, if measurement of distance is correctly performed. However, for an object having low contrast and/or low brightness, or an object having a particular pattern, for example, such as fine continuous patterns, since the ability of measurement of distance is inadequate or insufficient, there will be an error in the measurement of distance. In such a case, the taking lens is further moved from its infinity position or nearest taking position.

Further, if the taking lens is desired to be focused to the object situated ahead of the nearest taking position, the driving mechanism tries to further move the taking lens beyond the nearest taking position However, normally, in such camera, since mechanical stops are arranged in the infinity position and the nearest taking position, the taking lens cannot be moved beyond such stops. Accordingly, in the above-mentioned case, the movable member (taking lens) will be abutted against one of the stops.

The servo-control system in the auto-focus apparatus mentioned above is a typical example of a driving system wherein a rotational force is transmitted to a load through a gear transmission mechanism and the range of movement of the load (movable member) is mechanically limited, as mentioned above. In the driving operation in such auto-focus apparatus, the movable member will also abut against a stop, in the case where, a focusing condition detecting means determines that the measurement of distance cannot be effected. In such case, whether the measurement of distance can be performed in any position or positions within a photo-possible range may be determined by forcibly moving the taking lens through such photo-possible range (i.e., in a so-called scanning mode).

In any case, when the movable member reaches the stop, since the driving system is forcibly stopped, a pulse corresponding to the movement of the movable member will not be outputted. Accordingly, the driving system is stopped when the fact that such pulse is not outputted is detected.

In practice, the rotation speed of the motor varies in response to the fluctuation of the load or the supply voltage, and, in particular, when the motor is started or when the motor is reversed after the motor is once stopped, it takes some time until the motor reaches its steady rotation speed after the motor is started, due to the starting characteristic of the motor. Accordingly, it is difficult to set the time-out time period for detection of a pulse to a short time duration uniformly. Thus, in consideration of the above problem, the time-out time period must be long enough not to detect an erroneous limitation.

However, if the time-out time period is set to be long, when the load (movable member) really reaches the limitation (stop), it is impossible to stop the supply of current to the motor quickly. For this reason, in the conventional driving system, the motor is subjected to large mechanical stress, causing vibration noise, and causing mechanical damage or bad mechanical operation, as the case may be.

SUMMARY OF THE INVENTION

Accordingly, an object of the present invention is provide a drive controlling apparatus which can solve the above-mentioned conventional drawbacks.

In order to achieve the above object, a drive controlling apparatus according to the present invention comprises a drive means for driving a movable member having a mechanically limited range of movement; a feedback pulse generating means for detecting the movement of the movable member and for outputting a number of pulse signals corresponding to an amount of movement of the movable member; a main timer for measuring the period or interval of the pulse signals and for outputting a signal when one of a plurality of comparison time values (previously set in accordance with the start characteristic of the drive means so as to have respective comparison times which become shorter, in steps, successively from the start of the drive means to the steady state of the drive means) coincides with a corresponding measured time period a sub timer for measuring time one or more periods from the start of the drive means to the steady state of the drive means and for changing the plurality of comparison values successively; and a control circuit means for stopping the drive means in response to the signal outputted from the main timer.

In the drive controlling apparatus having the above construction according to the present invention, since a comparison value having an adequately long time is set according to the characteristic of the drive means in the starting of the drive means, even if the driving speed of the drive means immediately after the starting thereof is relatively slow and the period of the pulse signals becomes longer, the time-out time period can be detected without error. Further, when the steady state of the movable member is reached and the period of the pulse signals becomes shorter, since the comparison value also becomes shorter, the time-out time period can be immediately detected.

Therefore, since the drive means can be stopped immediately after the movable member is abutted against the limitation or stop, it is possible to reduce the excessive torque which otherwise will act on a transmission system of the drive means and movable member.

Other objects, features and effects of the present invention will be apparent from the following description regarding the present invention with reference to the accompanying drawings.

BRIEF DESCRIPTION OF THE DRAWINGS

FIG. 7A shows a flow chart of a main routine, FIG. 7B shows a flow chart for pulse interruption, FIG. 7C shows a flow chart for interruption of a sub timer, and FIG. 7D shows a flow chart for interruption of a main timer;

DESCRIPTION OF THE PREFERRED EMBODIMENTS

The present invention will now be explained in connection with embodiments thereof with reference to the accompany drawings.

Figure 1:
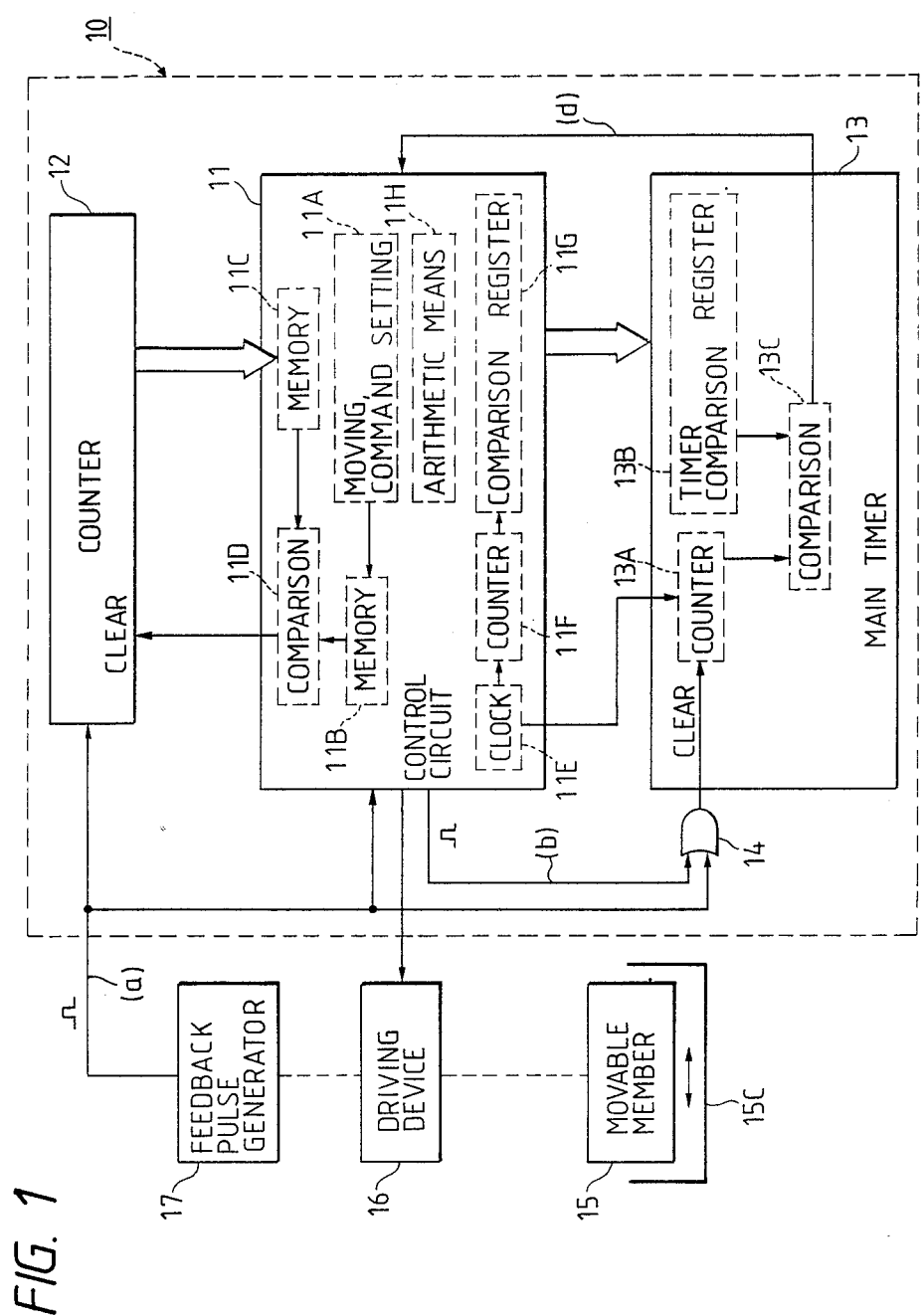
FIG. 1 is a block diagram of a drive controlling apparatus according to an embodiment of the present invention.

FIG. 1 is a circuit block diagram showing the construction of the drive controlling apparatus according to an embodiment of the present invention. The controlling apparatus 10 includes a control circuit 11, a pulse counter 12, a main timer 13, and OR gate 14.

A feedback pulse from a feedback pulse generator 17 for converting the operation of a driving device 16 for driving a movable member 15 into a pulse output is inputted to the control circuit 11 and the pulse counter 12 and is also inputted to a clear input of the time-out time period detecting main timer 13 through the OR gate 14.

Figure 2:
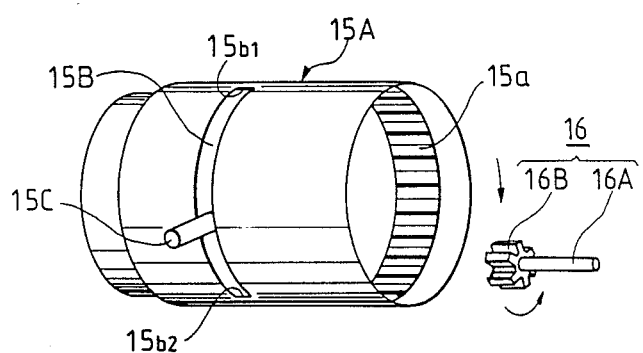
FIG. 2 is a perspective view of a movable member shown in FIG. 1.

FIG. 2 schematically shows the movable member 15 comprising a rotatable member. In this case, the movable member 15 comprises, for example, a rotary barrel 15A in a lens mount of a taking lens. The barrel 15A is rotated through an internal gear 15a meshed with a gear 16B fixed to a motor shaft 16A of a motor M (FIG. 3) constituting the driving device 16. When a stop member 15C is abutted against one of terminal ends $15b_1$, $15b_2$ of a circumferential groove 15B, the barrel is stopped.

Figure 3:
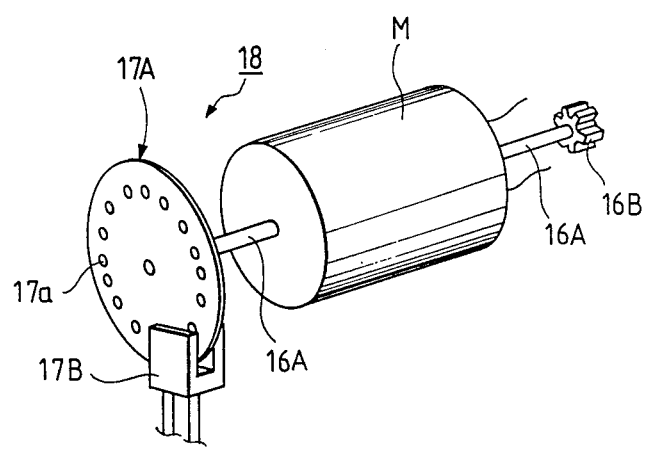
FIG. 3 is a perspective view of a feedback pulse generating device shown in FIG. 1.

Further, the feedback pulse generator 17 comprises a rotary encoder for detecting the displacement of the movable member 15 which includes, as shown in FIG. 3, a photo-interrupter 18 comprising a slitted disc 17A fixed to the motor shaft of the motor M and provided at its peripheral portion with a number of slits 17a, and a photo-coupler 17B having a photo-diode (LED) and a photo-transistor. In this arrangement, each time when the photo-transistor receives the light emitted from the photo-diode and passed through the slit 17a during the rotation of the slitted disc 17A, a pulse is outputted.

In FIG. 1, the control circuit 11 includes a moving command setting means 11A corresponding to an objective position of movement of the movable member 15, a memory means 11B for storing such command, a memory means 11C for storing the number of the feedback pulses counted by the counter 12, and a comparison means 11D for comparing the command stored in the memory means 11B with the number of pulses stored in the memory means 11C, and for outputting a clear signal to the counter 12 when the command coincides with the number of pulses and further outputting a stop signal to the driving device. Further, the control circuit 11 also includes a clock pulse generating means 11E, and a sub timer 11F different from the main timer 13. The sub timer 11F has a comparison value register 11G for storing a time for holding the timer comparison value to set the time-out time period between the time when the movable member 15 is stopped by the stop member 15C and the time when the supply of current to the driving device 16 is stopped.

Further, the main timer 13 is provided with a counter 13A for counting the clock pulses from the clock pulse generating means 11E of the control circuit 11, a timer comparison value register 13B for storing the timer comparison value, and a comparison means 13C for comparing the counted value in the counter 13A with the timer comparison value stored in the register or memory 13B and for outputting a coincidence signal to the control circuit 11 when these values coincide with each other.

The control circuit 11 sends a stop signal to the driving device 16 when it receives the coincidence signal, thus stopping the operation of the motor M. Further, the control circuit 11 sends a clear signal to the counter 13A through the OR gate 14 when the clock pulse count value in the sub timer 11F reaches a predetermined value stored in the comparison value register 11G, thus resetting the counter 13A.

Next, the embodiment shown in FIG. 1 will be explained with reference to signals (a)-(d) shown in FIG. 4.

A signal (a) shows a feedback pulse signal, outputted from the feedback pulse generator 17, from the start of the driving device 16 to the time-out; a signal (b) shows a clear signal for resetting the counter 13A through the OR gate 14 upon setting of a comparison value td in the sub timer 11F; a signal (c) shows a count value $h_1$ of the clock pulses and a timer comparison value $h_2$; and a signal (d) shows a coincidence signal outputted from the main timer 13.

Incidentally, since the number of pulses outputted from the feedback pulse generator 17 corresponds to the distance of movement of the movable member 15, if the movable member 15 comprises the taking lens, the control circuit 11 can focus the taking lens by receiving the feedback pulses.

In the given time interval td representative of the comparison value immediately after the starting of the motor, the timer comparison value $h_1$ outputted from the control circuit 11 and stored in the timer comparison value register 13B to be compared with the count value of the clock pulses is set to a HIGH level, thus setting a long time-out time period $te_1$ representative of a predetermined time interval for the termination detection.

After the time period td has elapsed, the sub timer 11F of the control circuit 11 changes the timer comparison value $h_2$ to a LOW level, and sets a relatively short time-out time period $te_2$, assuming that the driving system reaches its steady state.

More particularly, sub timer 11F in the control circuit 11 clocks the time td. After the time period td has elapsed, the control circuit 11 outputs the signal (b), thus clearing the counter of the pulse time-out time period detecting main timer 13 to zero, and at the same time, setting the comparison value $h_2$. The time-out time period is detected by inputting the coincidence signal (d) to the control circuit 11 when the comparison value $h_2$ stored in the register 13B of the main timer 13 coincides with the count value in the counter 13A, whereby the control circuit 11 shuts off the supply of current to the motor M, thus stopping the motor.

Next, an operation of the drive controlling apparatus will be explained with reference to FIG. 4.

Figure 4:
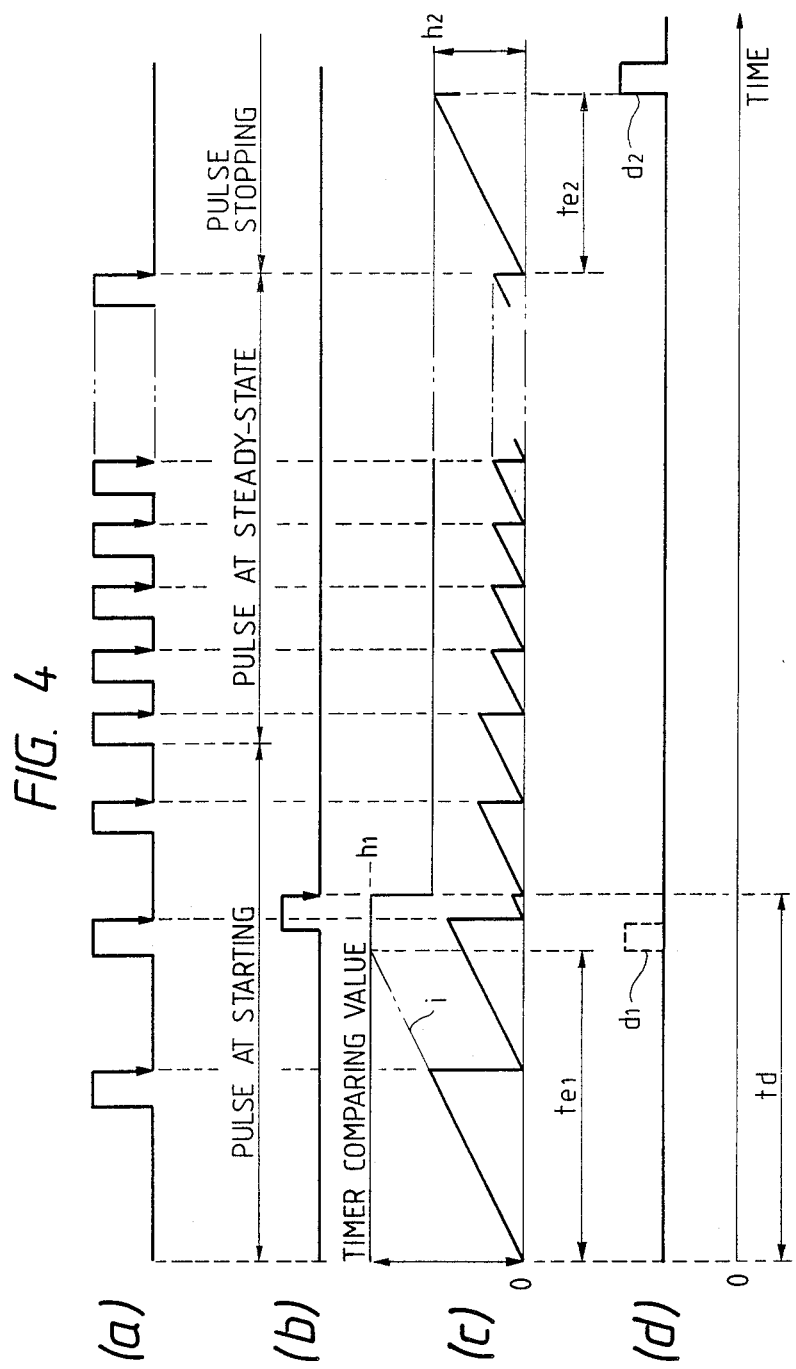
FIG. 4 is a signal timing chart for explaining two step timer comparison values set in the apparatus of FIG. 1.

In FIG. 4, the count value of the clock pulses counted by the counter 13A of the main timer 13 is increased as shown by the serrated wave shape of the signal (c). The count value is reset to zero each time when the feedback pulse in the signal (a) is produced.

If, after the movable member 15 is stopped by abutting against the stop, a time has elapsed in which that the feedback pulses are not inputted, the count value reaches the timer comparison value $h_2$, as shown by a two-dot and chain line, and the coincidence signal ($d_1$) is outputted from the main timer 13 to the control circuit 11 at the time $te_1$, as shown in the signal (d). The time period before this coincidence signal is outputted corresponds to a long predetermined time-out time period $te_1$ in which the timer comparison value $h_1$ is in the HIGH level.

In this way, the control circuit 11 detects the fact that the movable member 15 reaches the mechanical limitation.

After the time period td has elapsed, since the timer comparison value $h_2$ outputted from the control circuit 11 to the timer comparison value register 13B becomes LOW level, a predetermined time-out time period $te_2$ before the coincidence signal $d_2$ is outputted from the main timer 13 will be shorter. Accordingly, after the time period td has elapsed, when the driving system reaches its steady state, the time-out time period $te_2$ is relatively short, thus detecting the stop of the movable member quickly.

Figure 5:
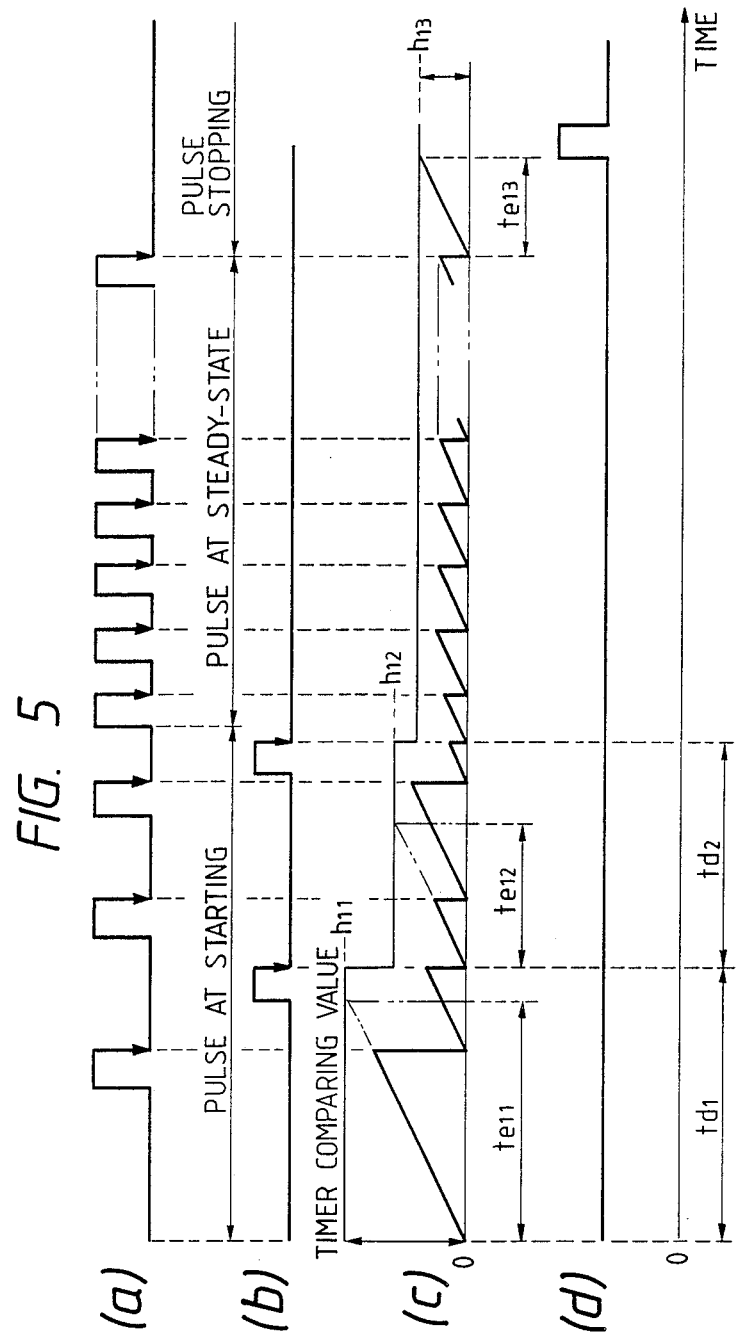
FIG. 5 is a signal timing chart for explaining three-step timer comparison values set in the apparatus of FIG. 1.

FIG. 5 shows a time chart in the case where the timer comparison value is set with three steps, where signals (a)-(d) correspond to those shown in FIG. 4, respectively.

In FIG. 5, the steps of setting the timer comparison value from the starting of the driving system are increased; that is to say, the comparison value is divided into three steps $h_{11}$, $h_{12}$, $h_{13}$ corresponding to the time period $td_1$, time period $td_2$ and a subsequent time period, respectively, until the driving system reaches its steady state, thus shortening the time-out time periods $te_{11}$-$te_{13}$ gradually. Of course, the timer comparison value may be divided into more steps. The time-out time periods $te_{11}$, $te_{12}$, $te_{13}$ in the respective steps correspond to predetermined time intervals previously set.

Next, the signals shown in FIG. 5 will be explained.

After the motor M is energized, the detecting time of the feedback pulses is detected as the time-out time period on the basis of the timer comparison value $h_{11}$ of the highest level set in the comparison value setting means 11G of the control circuit 11. The time-out time period $te_{11}$ is the longest.

Then, during the time period $td_2$, the time-out detection is effected on the basis of the timer comparison value $h_{12}$ of an intermediate level. Time-out time period $te_{12}$ is longer than a following steady state time-out time period $te_{13}$, but is shorter than the aforementioned time-out time period $te_{11}$.

In the steady state, since the detection is effected on the basis of the comparison value $h_{13}$ of the lowest level, time-out time period $te_{13}$ will be shortest, and, thus, the stop of the movable member can be quickly or immediately detected.

In the example shown in FIG. 5, although the setting of plural comparison values in the main timer 13 is more complicated, since the time-out time periods are changed smoothly in steps, the time for detecting the termination in the steady state can be more shortened.

Figure 6:
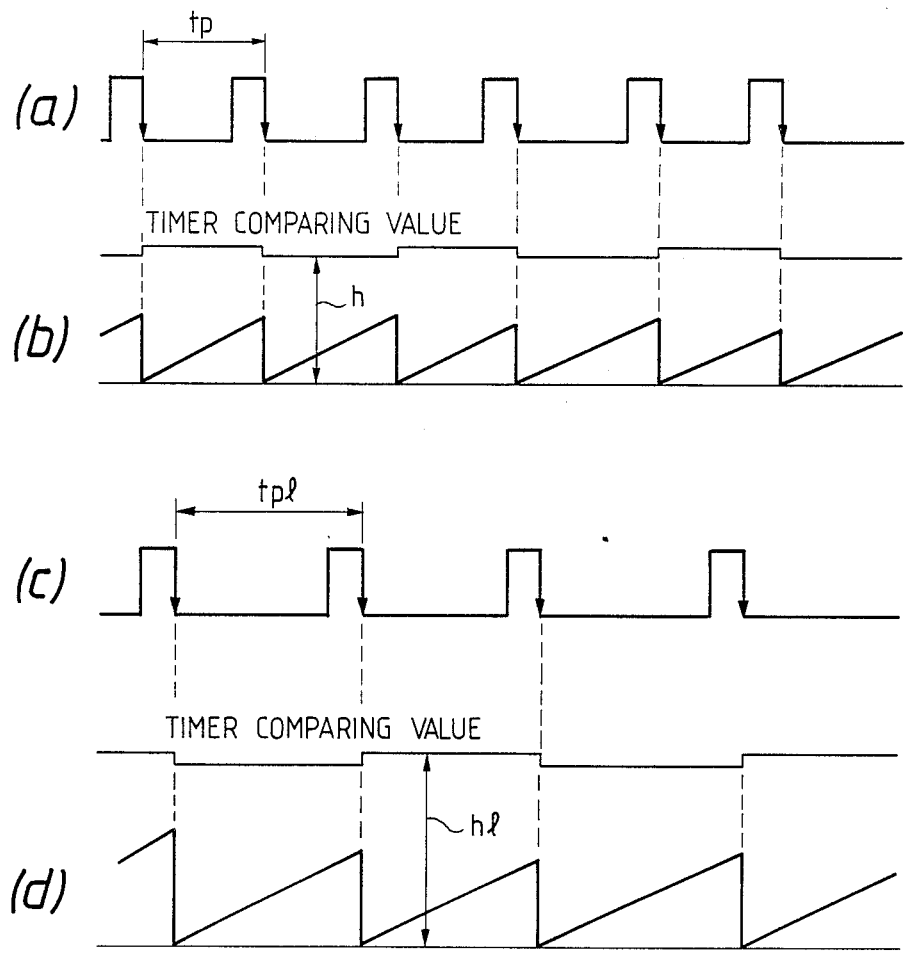
FIG. 6 is a signal timing chart for explaining a plurality of time comparison values variably set in the apparatus of FIG. 1.

FIG. 6 is a signal timing chart showing an example in which the pulse detecting time-out time period, when the driving system is in the steady state, is repeatedly set on the basis of the period of pulses. This is applied to the time duration after the time period td in FIG. 4 or the time period $td_1 + td_2$ in FIG. 5 has elapsed.

In FIG. 6, the difference between a time when the feedback pulse is inputted and a time when the previous feedback pulse is inputted corresponds to the period tp of pulses, which changes from time to time within a small range.

A time period K.tp obtained by multiplying the pulse time period tp by an appropriate factor of safety K corresponds to a predetermined time period for detecting the time-out, and the timer comparison value h corresponding to this time period is repeatedly set. The factor of safety K may be, for example, 3–5.

An operating or arithmetic means 11H (FIG. 1) of the control circuit 11 calculates the pulse time period tp on the basis of the difference between a time when the feedback pulse is inputted and a time when the previous feedback pulse is inputted, each time when the feedback pulse is inputted.

Further, the calculating means 11H calculates the time period K.tp obtained by multiplying the pulse time period tp by an appropriate factor of safety K. By using the time period K.tp as the time-out time period for the feedback pulses, the count value of the clock pulses corresponding to this time-out time period is compared with the timer comparison value, and the result is outputted to the main timer 13, thus setting the time-out time period again. That is to say, the control circuit 11 re-sets a different timer comparison value h each time when it receives the feedback pulse.

In this way, even if the rotational speed of the motor M is changed due to the fluctuation of the mechanical load and/or power voltage, the control circuit 11 automatically detects the change in the speed of the motor on the basis of the pulse time period tp, thus setting an appropriate time-out time period for detecting the termination of the movement of the movable member 15 in the main timer 13.

(a) and (b) in FIG. 6 show the changes of the count value in the main timer 13 and the timer comparison value h, when the period tp of the feedback pulses is short.

The period tp of the feedback pulses varies from time to time, and thus, each time when the feedback pulse is inputted, at a negative edge of the pulse, the comparison value h to the main timer 13 varies slightly.

In FIG. 6, (c) and (d) show signals indicating the changes of the count value in the main timer 13 and the timer comparison value h, when the period tpl of the feedback pulses is long.

Of course, each time when the feedback pulse is inputted, the timer comparison value hl is re-set, and since the pulse period tpl in the signal (c) is longer than the pulse period tp in the signal (a), the level of the time comparison value hl in the signal (d) is wholly higher than that in (b).

Incidentally, in FIG. 6, while the timer comparison values h, hl used in the main timer 13 were obtained by multiplying the pulse periods tp, tpl by the respective factors of safety K, the comparison value may by obtained by multiplying an average of a plurality pulse periods by the factor of safety, in consideration of safety.

For example, four successive pulse periods may be stored, and, each time when a new feed back pulse is produced, a new pulse period may replace the oldest stored pulse period. The timer comparison value ($K.\overline{tp}$) may be calculated by the arithmetic means 11H on the basis of an average ($\overline{tp}$) of the most recent four pulse periods.

Incidentally, it should be noted that the timer comparison value shown in FIG. 6 can be used with the timer comparison values for setting the time-out time periods in the starting of rotation (including a reverse rotation) of the motor as shown in FIGS. 4 and 5.

FIGS. 7A to 7D are flow charts for explaining a control operation of a motor servo mechanism by the control circuit 11 including a CPU when a combination of time-out time period control shown in FIGS. 5 and 6 is carried out.

Figure 7A:
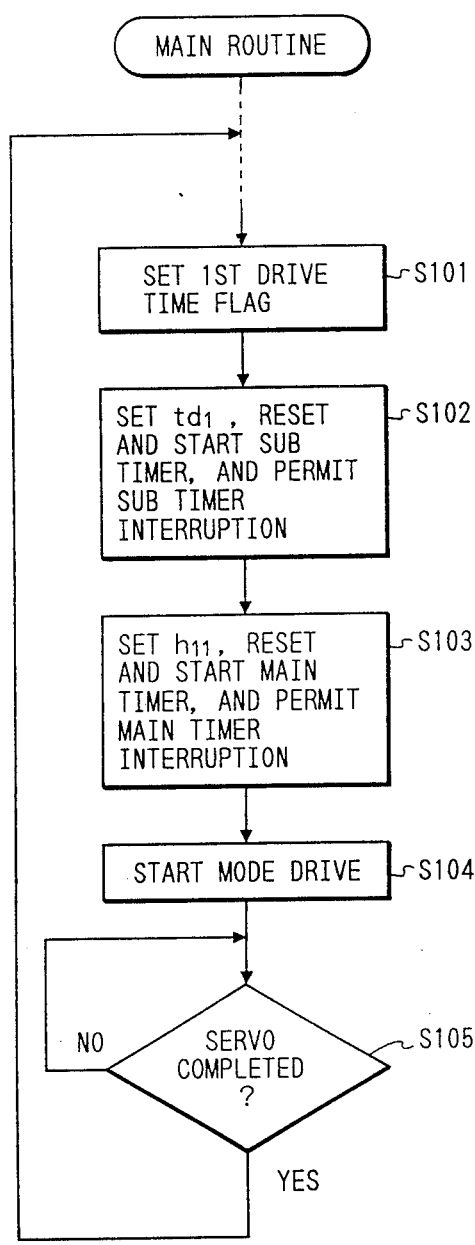
FIGS. 7A to 7D are flow charts for the combination of the three-step timer comparison values of FIG. 5 and the plurality of timer comparison values of FIG. 6, where

In FIG. 7A showing a flow chart of a main routine, after the CPU in the control circuit 11 starts and begins working, initial setting for various kinds of interruptions used for motor driving control is effected. Concurrently, pulse interruption is allowed.

First, in step S101, a first drive time flag which shows the servo is in $td_1$ immediately after the motor or rotates reversely, is set. Subsequently in step S102, a value corresponding to time period $td_1$ is set in the comparison register 11G of the sub timer 11F the counter of the sub timer is reset and started, and interruption by the sub timer is permitted.

In step S103, a timer comparison value $h_{11}$ relatively great corresponding to time-out time period $te_{11}$ is set in the main timer 13 for detecting the drive limitation the counter 13A in the main timer 13 is reset and started, and interruption by the main timer 13 is also permitted.

In a step S105, the sequence wait until the servo of the servo mechanism including the counter 12, moving command setting means 11A and motor M is completed. Meanwhile, various interruptions are permitted and, for example, a servo operation such as the movement of the taking lens for auto-focus can be performed.

Figure 7B:
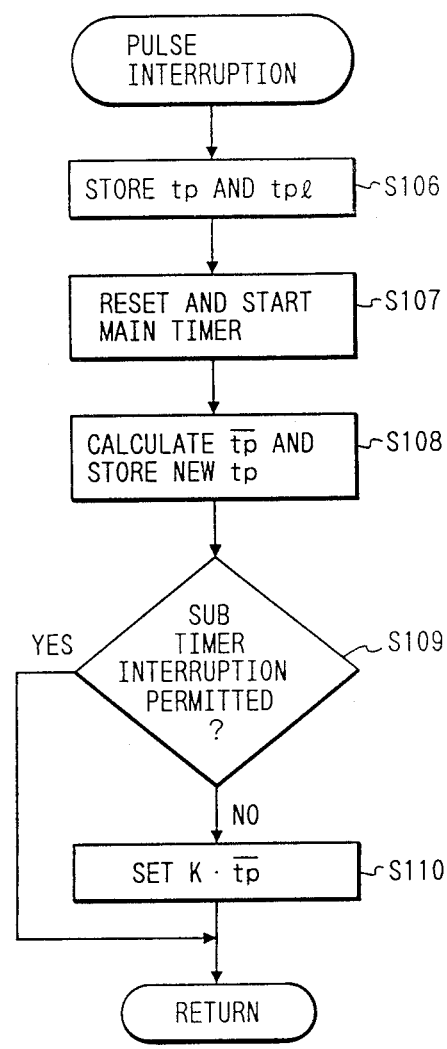

After the motor starts to rotate in step S104, each time when the pulse is feedback from the feedback pulse generator 17, a pulse interruption as shown in FIG. 7B (described later) occurs. In this case, however, while the set interruption by the sub timer 11F is permitted in step S102, the sequence goes to RETURN in accordance with the determination in step S109. The inhibition of the interruption of the sub timer is presented only after the second interruption of the sub timer has occurred when the time duration $td_1 + td_2$ after the starting of the motor has elapsed this, the timer comparison value $h_{11}$ set after the start of the motor and the timer comparison value $h_{12}$ set in the first interruption of the sub timer (when the time period $td_1$ has elapsed after the start of the motor) remain unchanged during the time durations $td_1$, $td_2$. Accordingly, during such time durations, regarding the interruption of the pulse, only the pulse period tp is measured.

In the flow chart of FIG. 7B regarding pulse interruption periods of the feedback pulses, i.e., the pulse periods tp, tpl from the time of the previous interruption of the pulse shown in (a), (c) of FIG. 6, are stored (in step S106) and further, as shown in (b), (d) of FIG. 6, the counter 13A of the main timer 13 is reset and started (in step S107), and then the sequence goes to the next step.

In the next step S108, an average pulse period tp is calculated by the arithmetic means 11H from n pulse periods, including the newest pulse period tp and the preceding (n-l) pulse periods tp that have been stored, and at the same time the newest pulse period tp is stored. Then, as mentioned above, in a step S109, it is determined whether the interruption of the sub timer in the step S103 of the main routine is permitted or not. The interruption of the sub timer occurs when the time duration $td_1$ or $td_1+td_2$ has elapsed after the motor is started; before this, if the determination of step S109 is affirmative, the sequence goes to RETURN, and thus, the time duration $td_1$ or $td_2$ for holding the timer comparison value $h_{11}$ or $h_{12}$ remains unchanged.

When the second interruption of the sub timer occurs during the time duration $td_1+td_2$ after the motor is started, and a further interruption of the sub timer is inhibited in step S114, if the step S109 determines that the interruption of the sub timer is inhibited, the value K.tp obtained by multiplying the average pulse period $\overline{tp}$ by the factor of safety K is set in the register 13B as the timer comparison value for the main timer 13 (in step S110), and then, the sequence goes to RETURN.

Figure 7C:
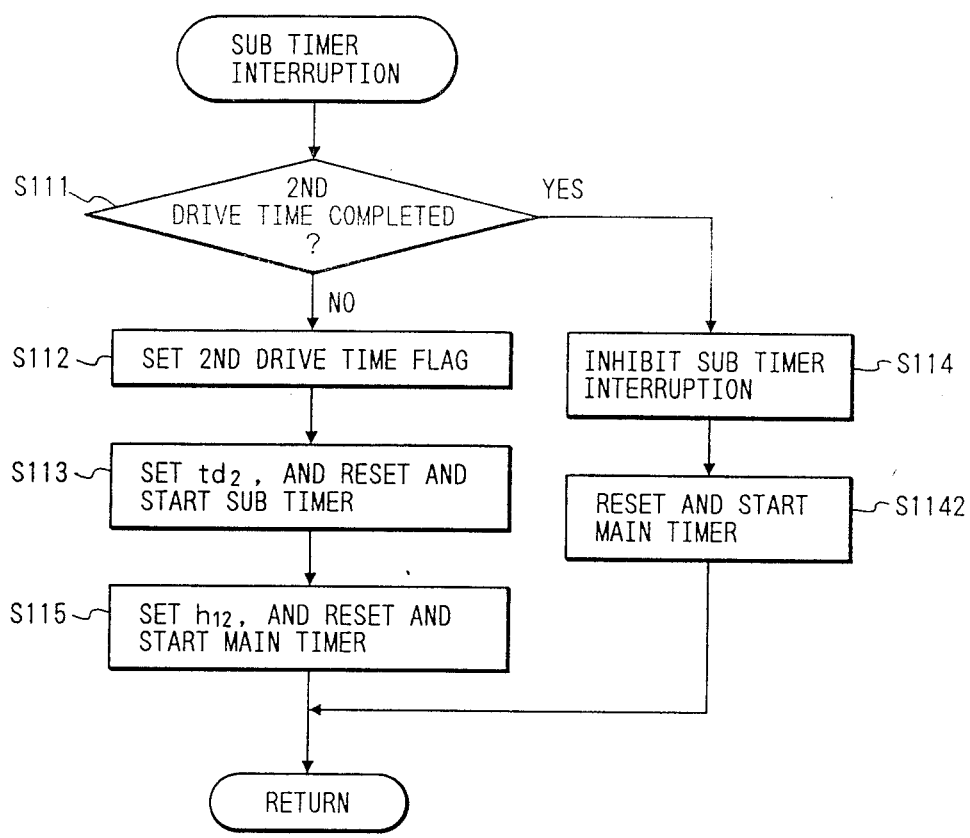

Further, as shown in FIG. 5, when the first interruption of the sub timer occurs after the time period (first drive time period) $td_1$ following the start of the motor, the sequence goes to steps S111, S112, S113 shown in FIG. 7C, successively. That is to say, in the step S111, it is determined whether a second drive period $td_2$ is completed or not. Because of the first interruption, the determination of step S111 is negative, and thus, a flag for indicating the proceeding of control in the second drive period is set (in step S112). Next, in step S113, the second drive period $td_2$ is set in the comparison register 11G of the sub timer and at the same time the counter of the sub timer 11F is reset and started. Accordingly, the next interruption of the sub timer occurs after the period $td_2$. In this second interruption of the sub timer, since the flow chart flow is from step S111 to S114, the interruption of the sub timer does not occur thereafter. Following step S113, in step S115, the time $h_{12}$ in the second drive period is set in the main timer again and the counter of the main timer is reset and started.

In this way, the period $td_2$ is set in the counter of the sub timer 11F, and the counter of the sub timer starts to count from zero again. In step S115, the comparison value of the main timer 13 for detection of termination is set again to have the timer comparison value $h_{12}$ firstly set in the main routine. As mentioned above, during the second drive period $td_2$, this comparison value is not changed.

On the other hand, in step S111, when it is determined that the second drive period $td_2$ has been completed, the interruption of the sub timer is inhibited in step S114, and thereafter, the sequence goes to step S1142 where the main timer is reset and started. After the second drive period has elapsed and the interruption of the sub timer is inhibited in the step S114, the value $h_{12}$ set in step S115 is successively rewritten in accordance with the detected pulse periods in the operation of the interruption of the pulse as shown in FIG. 7B.

As shown in FIG. 5, during a predetermined time period (first drive period $td_1$ and second drive period $td_2$) where the pulse period of the feedback pulses is relatively long, in consideration of the start-up time of rotation of the motor M, the above-mentioned method for setting or fixing the time-out time period ($te_{11}$, $te_{12}$ corresponding to the timer comparison values $h_{11}$, $h_{12}$) of the feedback signals (pulse) for monitoring the rotation of the motor to a relatively long time or large value is used, in order to avoid an error in termination detection.

Among the timer comparison values of the main timer 13 for the time-out detection, the comparison value $h_{11}$ is set in the timer comparison value register 13B upon the start of the motor (step S101) in the main routine. On the other hand, the comparison value $h_{12}$ is set again in step S115 in the subroutine for the interruption of the sub timer executed after the time period $td_1$ set by the sub timer in step S103 of the main routine has elapsed. The time period $td_2$ for maintaining the comparison value $h_{12}$ effective is determined or set in the step S113.

When the period $td_2$ has elapsed, the interruption of the sub timer occurs again, and the sequence goes to the step S111, S114 and S115, successively. Accordingly, the interruption of the sub timer does not occur thereafter.

Figure 7D:
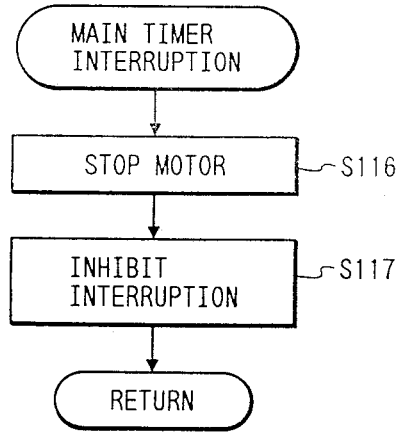
Figure 8:
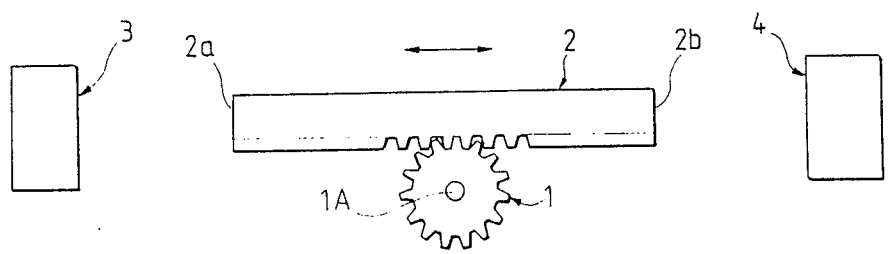
FIG. 8 is a schematic view for explaining a conventional driving system including a movable member having a linear movement.
Figure 9:
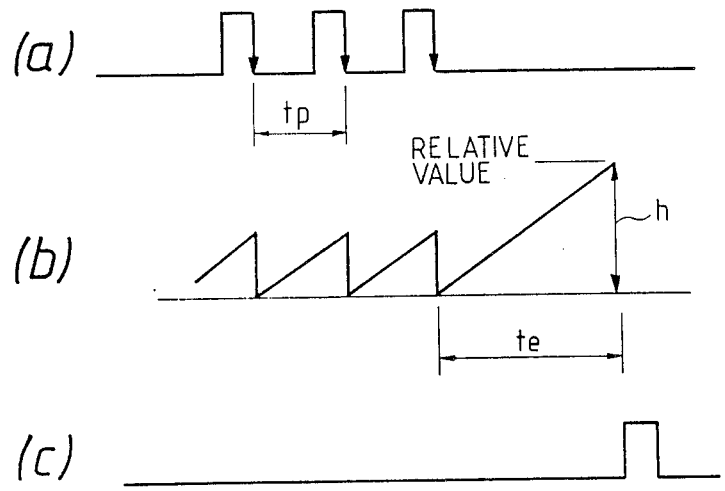
FIG. 9 is a signal timing chart for explaining a principle of detection of a time-out time period in a conventional technique.

When the period $td_2$ has elapsed, the time-out detection on the basis of the time comparison values shown in FIG. 6 is realized by the interruption of the main timer shown in FIG. 7D and the interruption of the sub timer shown in FIG. 7B.

Each time when the interruption of the pulse from the feedback pulse generator 17 occurs, the time tp elapsed from the previous pulse generation is stored in the step S106, and, the main timer 13 is reset and started again in the step S107 in order to measure the time period up to a next pulse generation. As already explained in connection with FIG. 6, although the time period tp (or tpl) of the feedback pulses can be used as the base for the calculation of the timer comparison value h, in order to obtain more stable measurement result, in the step S108, the average of n pulse periods including the most recent (n-l) stored pulse periods and the newest pulse period is calculated. Accordingly, the control circuit 11 has a memory area for storing the most recent (n-l) pulse periods tp (or tpl), and, each time when a new pulse period tp (or tpl) is obtained, the oldest stored pulse period is replaced by the new pulse period.

When the average time period $\overline{tp}$ of the feedback pulse is obtained as mentioned above, in the step S109, it is determined whether the interruption of the sub timer is permitted, i.e., whether the present time resides in the control area of the time period ($td_1+td_2$) following the starting of the motor as shown in FIG. 5 or in the control area of subsequent time period. If the interruption of the sub timer is permitted, the present time resides in the control area of the time period following the starting of the motor. In this case, after the average pulse period $\overline{tp}$ of the feedback pulses is calculated, the sequence merely goes to RETURN, and the timer comparison value corresponding to the time-out time period of the main timer 13 is not set.

As explained in connection with FIG. 7B, when the step S109 determines the control area for successively setting the time-out time period on the basis of the average pulse period $\overline{tp}$ of the feedback pulses, in the step S110, the average pulse period is multiplied by factor of safety K, and the result is set as the timer comparison value for the main timer 13. In this way, each time when the interruption of the pulse occurs, the timer comparison value is set again as shown in (d) of FIG. 6.

In the flow chart of FIG. 7D showing the interruption of the main timer, when the coincidence signal from the main timer 13 is received, the control circuit determines that the termination movement is reached, and stops the operation of the motor M (in a step S116), and the interruption of the main timer, sub timer and pulse are inhibited (in step S117), and then, the sequence goes to RETURN. Accordingly, in the main routine, if the motor is started, the interruption of the main timer and sub timer are not executed, so long as such interruption are not permitted in the steps S102 and S103.

According to the drive controlling apparatus of the present invention, when the movable member being moved reaches a limitation at the termination of movement thereof, the time-out detection can be effected for a very short time in accordance with the operation condition at that time, and when the motor is started (including the reverse rotation), the time-out detection can be effected without being affected by the start characteristic of the motor or other factors, and, in the steady state, the time-out can be quickly detected, thus stopping the motor immediately. Therefore, the motor and/or the driving system for the movable member are not subject to excessive stress, and the time duration from the time when the movable member is abutted against the stop to the time when the supply of current to the motor is shut off, during which annoying noise is generated from the motor and/or mechanical parts, can be effectively shortened.

What is claimed is:

1. A driver controlling apparatus for controlling movement of a movable member having a mechanically limited range of movement, comprising:

drive means for supplying power to a motor to move said movable member;

feedback pulse generating means for detecting the movement of said movable member and for serially outputting a number of pulse signals corresponding to an amount of the movment of said movable member;

main timer means responsive to said pulse signals for successively measuring time periods between successive pulse signals, comparing the measured time period with a comparison level and outputting a signal when said measured time period has a predetermined relationship with said comparison level;

sub time means for measuring a time period from the start of said drive means, and for changing the value of said comparison level when the time period measured by said sub timer means is equal to a predetermined time period; and control means for causing said drive means to stop supplying power to said motor in response to said signal from said main time means.

2. A drive controlling apparatus according to claim 1, wherein said main timer means includes counter means for starting a clear operation each time when it receives the pulse signal from said feedback pulse generating means and an output signal from said sub time means, and a comparison means for outputting a signal to said control means when a counted value in said counter means coincides with said comparison value.

3. A drive controlling apparatus according to claim 1, wherein said sub timer means has register means for successively registering a plurality of comparison values previously set in accordance with the start characteristic of said drive means to correspond to respective time periods which become shorter, in steps, successively from the start of said drive means to the steady state of said drive means, and reads out said comparison values to said main timer means in the order from the largest one to the smallest one, thereby to provide different comparison levels for comparison with respective time periods measured by said main timer means.

4. A drive controlling apparatus according to claim 1, further including counter means for receiving said pulse signals outputted from said feedback pulse generating means and for outputting a signal corresponding to the amount of movement of said movable member, moving command setting means for setting an objective value of movement of said movable member, and comparison means for outputting a signal for clearing said counter means and a signal for stopping said drive means when said signal outputted from said counter means coincides with said movement objective value set by said moving command setting means.

5. A drive controlling apparatus according to claim 1, further including calculating means for calculating said comparison level in the steady state of said drive means by multiplying the time period of said pulse signals measured by said main timer means by an appropriate factor of safety, each time when said pulse signal is output in the steady state.

6. A drive controlling apparatus according to claim 1, further including calculating means for storing a plurality of time periods measured by said main timer means, for calculating said comparison level in the steady state by multiplying an average value of said stored time periods, and of a new time period measured by said main timer means, by an appropriate factor of safety, and for replacing the oldest stored time period with the new time period.

* * * * *